United States Patent [19]

Sawyer

[11] 4,274,567
[45] Jun. 23, 1981

[54] SHOPPING CART ORGANIZER

[76] Inventor: Patricia F. Sawyer, 402 E. Royal Palm, Phoenix, Ariz. 85020

[21] Appl. No.: 89

[22] Filed: Jan. 2, 1979

[51] Int. Cl.³ ............................................. B60R 11/00
[52] U.S. Cl. .................................. 224/42.43; 108/44; 150/34; 224/30 A; 224/36; 224/42.46 R; 224/277; 280/33.99 A; 40/10 R
[58] Field of Search .......... 186/1 AC; 40/10 R, 11 R, 40/13, 14, 308, 306, 312; 224/42.45 R, 42.46 R, 273, 274, 275, 276, 277, 42.42 R, 42.42 A, 42.45 B, 42.46 B, 42.43, 42.44, 30 A, 31, 36, 41; 150/34, 35; 108/44, 47, 49, 42; 280/33.99 A, 47.34, 289; 281/15 R, 45, 727

[56] References Cited

U.S. PATENT DOCUMENTS

| | | | |
|---|---|---|---|
| D. 153,348 | 4/1949 | Gainsboro | 108/44 X |
| 2,799,967 | 7/1957 | Molinari | 108/45 U X |
| 2,810,221 | 10/1957 | Reifsnyder | 224/277 X |
| 3,808,415 | 4/1974 | Hurst | 24/204 X |

FOREIGN PATENT DOCUMENTS

| | | | |
|---|---|---|---|
| 250192 | 10/1966 | Austria | 108/44 |
| 322650 | of 1929 | United Kingdom | 108/47 |

Primary Examiner—Robert J. Spar
Assistant Examiner—Jerold M. Forsberg
Attorney, Agent, or Firm—Drummond and Nelson

[57] ABSTRACT

An organizer attachment for use on a shopping cart of the type having a transversely extending handle and a forwardly spaced-apart transversely extending rod. The organizer includes a substantially flat desk panel provided with clip means on outer surface for securement of anote pad or similar writing material. The upper end of the desk panel is hingedly secured to a receptacle section which defines a compartment for receiving various materials such as premiums or coupons. A writing instrument is securable to the desk panel. In a position of use, the desk panel is supported on the transverse shopping cart handle at a bracket or fastener and the receptacle section suspended at the interior of the cart at generally right angles with respect to the desk panel and secured on hangers projecting from the inner side of the receptacle. In another embodiment of the present invention, a handbag compartment may be included in the receptacle section for reception of sundry articles such as coins, keys, cosmetics and other articles normally carried by the user.

7 Claims, 13 Drawing Figures

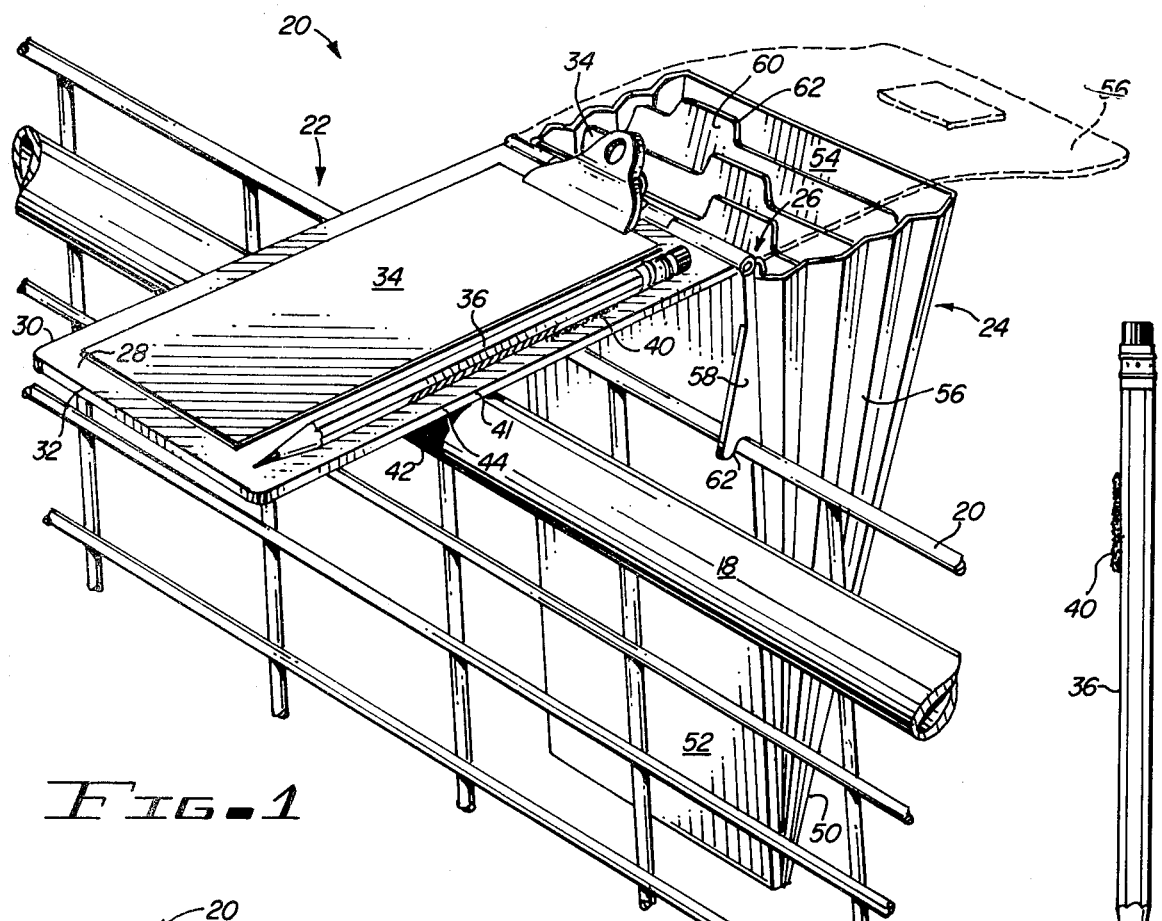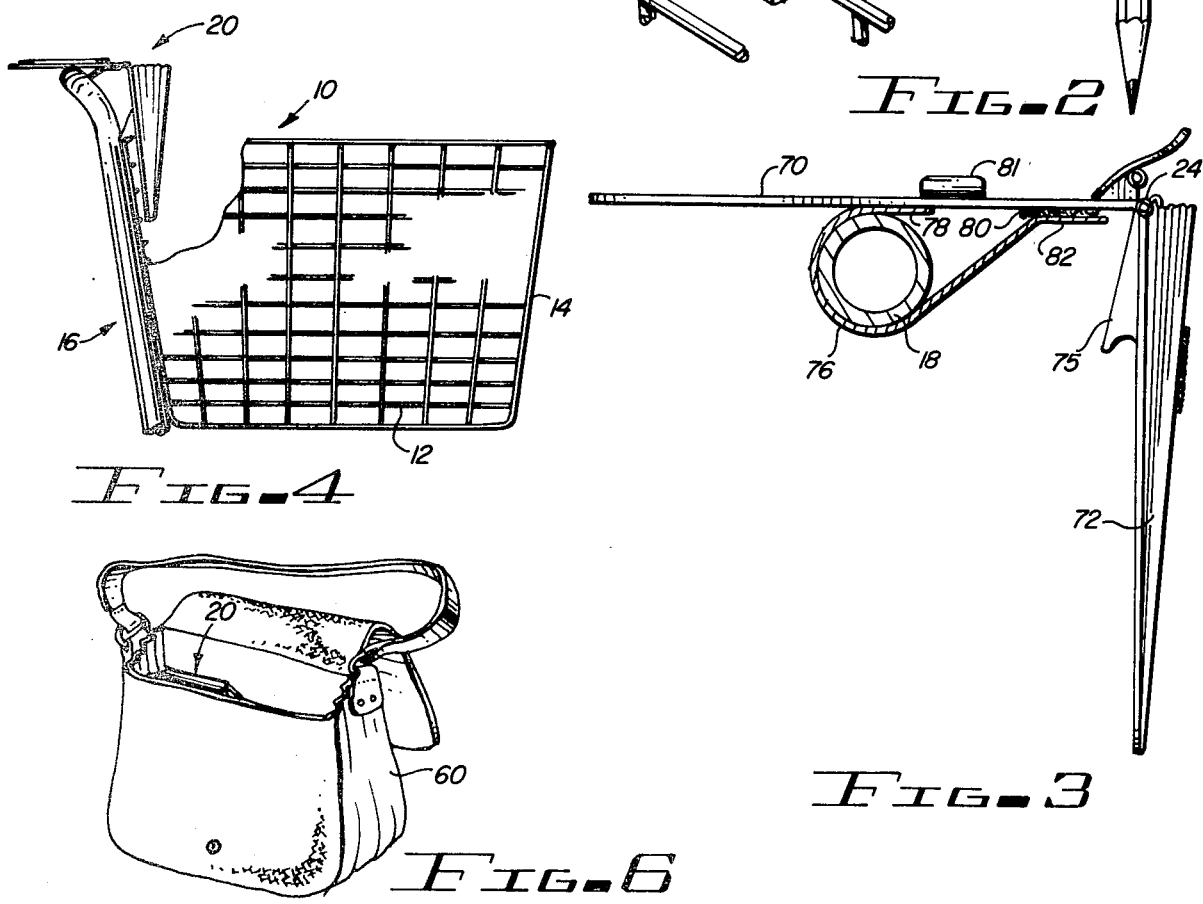

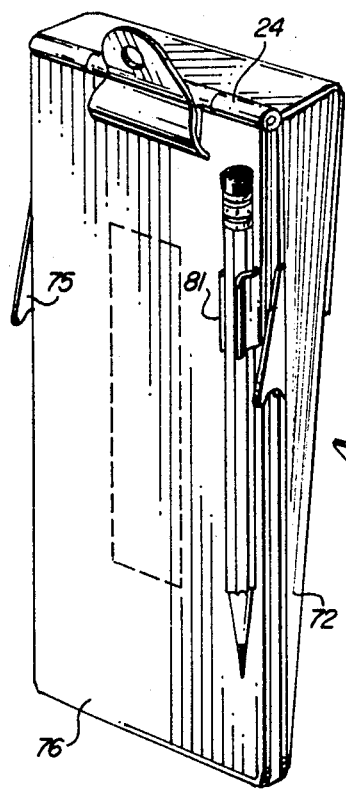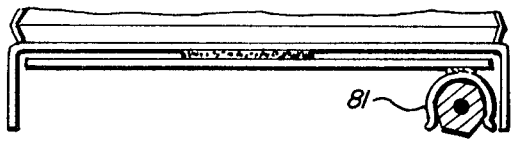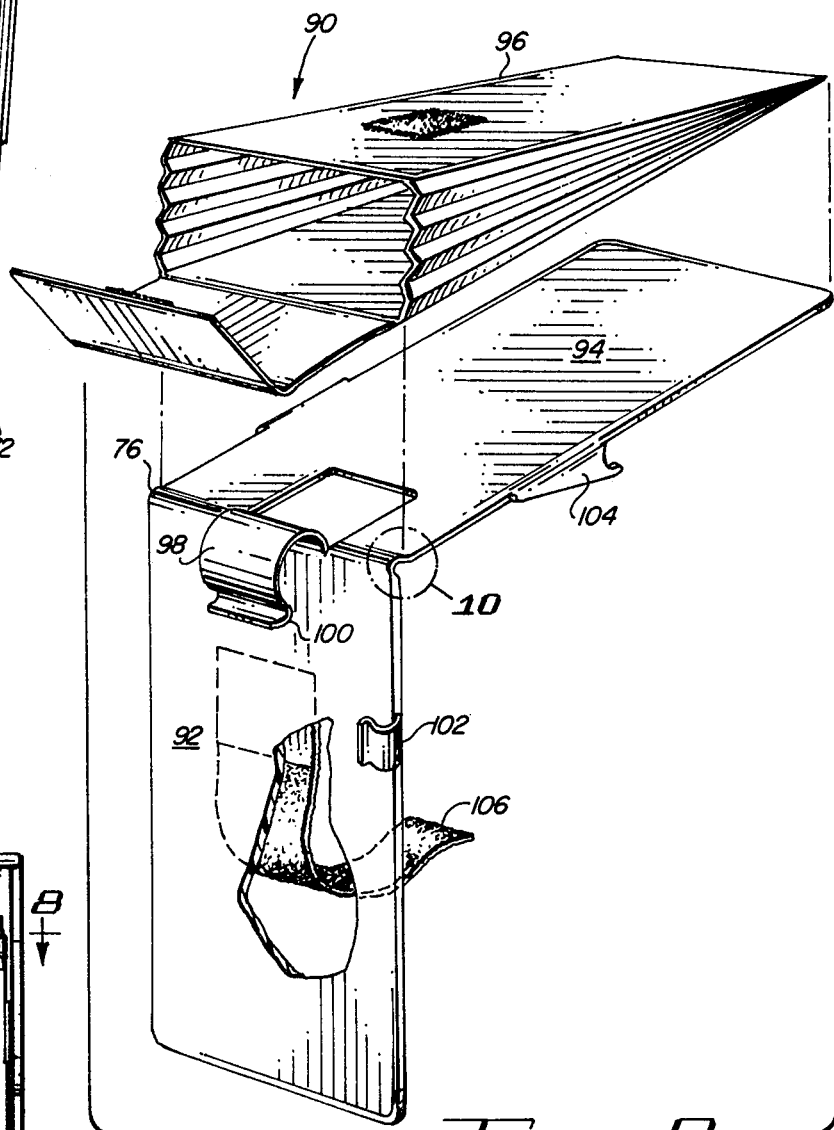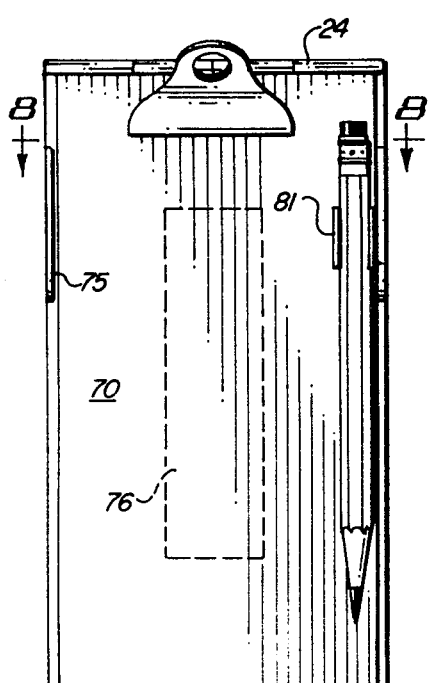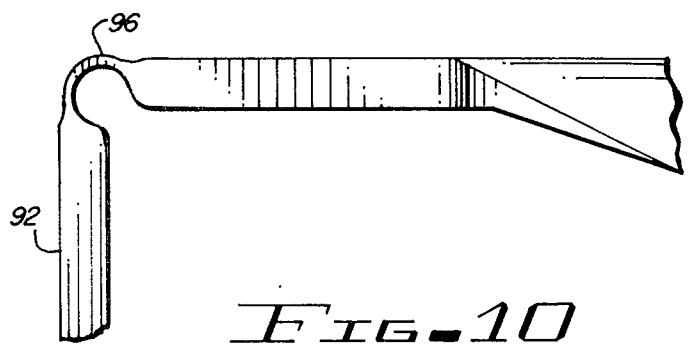

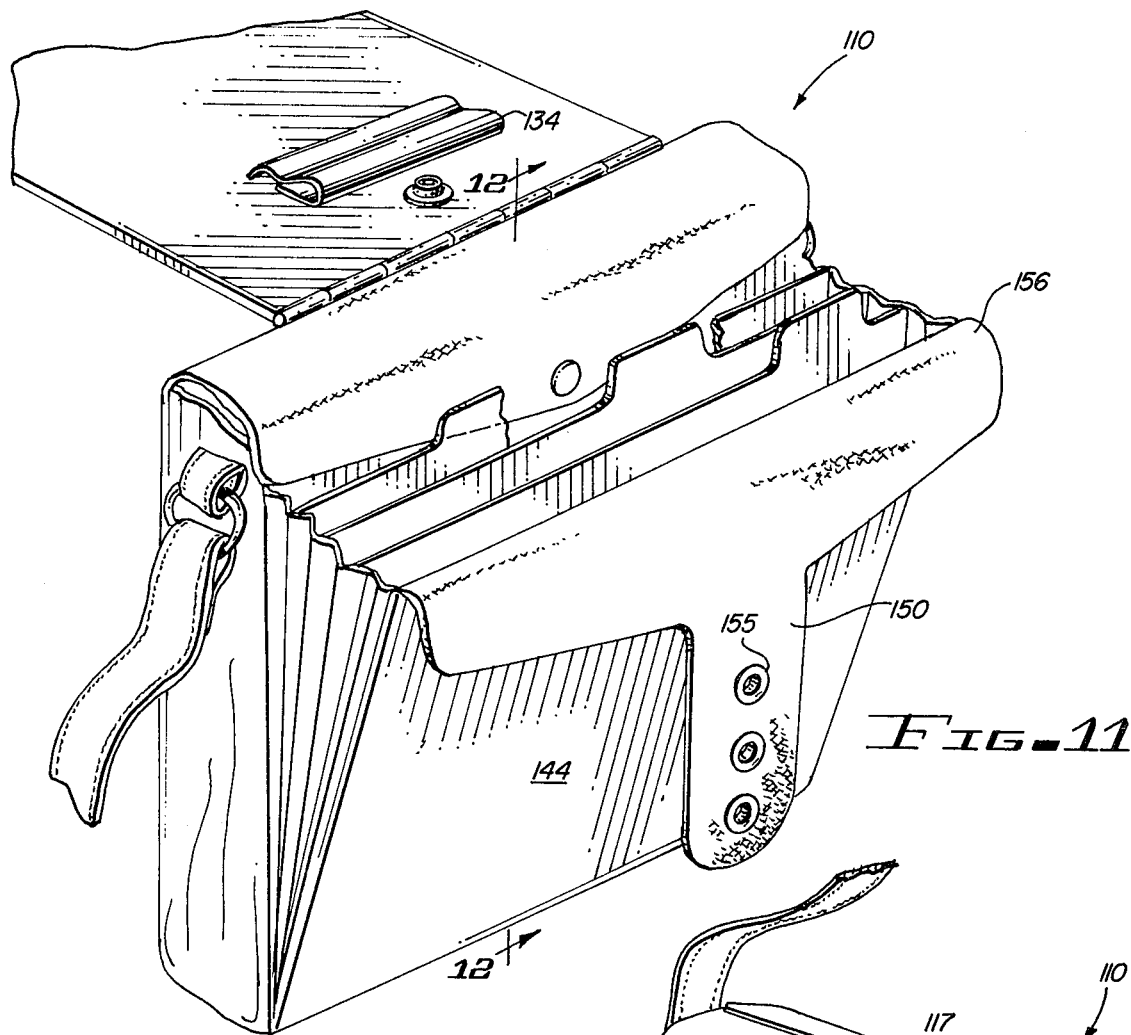
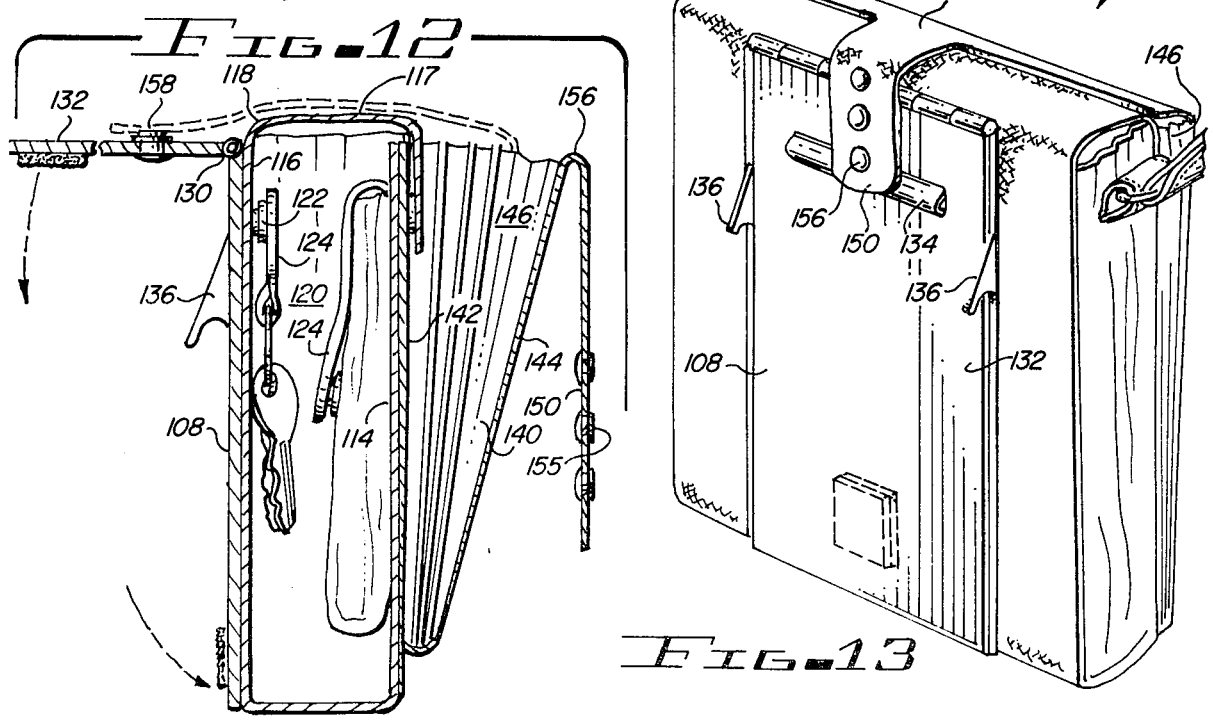

SHOPPING CART ORGANIZER

The present invention relates to a shopper's organizer. More particularly, the present invention concerns an organizer for the containment of coupons and premiums of the type commonly redeemable at food, drug and department stores and for the convenient display of a shopping list or memorandum.

It is common practice for producers of various products, generally in the food and drug lines, to promote certain items by the issuance of premiums or coupons which are redeemable by the consumer at the market place. These coupons often reach consumers through direct mail or appear in advertisements in newspapers or flyers available to the public. At the point of purchase, a discount is given to the consumer on the particular product in an amount shown on the face of the coupon. These coupons typically measure approximately $5\frac{3}{4}'' \times 2\frac{3}{4}''$ and the consumer presents one or more of these coupons at the check-out line of the establishment when paying the cashier. Shoppers, particularly the prudent or economy wise shopper, will often have a substantial number of these coupons in a handbag or pocketbook. Since these coupons must generally be applied towards the purchase of a specific item, it is necessary for the consumer to sort through the coupons and present the applicable coupons or premiums at the point of purchase. Locating and finding the proper premiums can also be a time consuming and frustrating operation in a lengthy supermarket check-out line. Accordingly, there exists a substantial need for a multiple pocket organizer and carrying case for redeemable coupons of the type described above.

A further problem is often presented to the shopper in keeping track of items desired to be purchased. Many shoppers in grocery and variety stores often prepare a list of items to be purchased before shopping. At the supermarket or store, the shopper will use a wheeled cart or basket and as various items are selected from the display or shelves they are placed in the basket. The shopper will often "check-off" the items from the list made in advance as items are put in the cart or basket. It is often a cumbersome task to attempt to hold the list in one hand, pencil in another and keep track of items purchased while at the same time maneuvering the cart around a crowded supermarket or store. This situation is often complicated by the added task of the frustrated shopper in trying to keep track of several errant children. Accordingly, there exists a need for a convenient way of retaining and displaying a shopping list to the shopper and for securing a writing instrument.

Various patents can be found in the prior art which show various shopping cart attachments. For example, U.S. Pat. No. 3,881,267 to Hicks shows a shopping cart list holder which can be attachably mounted to the handle of a shopping cart for securing a shopping list for the convenience of the user. A similar device is shown in Miller, U.S. Pat. No. 2,888,761. Both of these patents utilize clamp means for securing the holder to the cart. Another device is shown in the patent to Keller, U.S. Pat. No. 3,539,204 which shows an attachment having a clip on the underside which is adapted to be pushed over the rim-rod of the cart to secure the attachment in place. These patents are believed to be representative of the art and are deficient in various respects. None of the devices have provision for organized retention of coupons and premiums to be used in conjunction with a shopping list holder. Further, most involve rather complex attachment devices which either are unwieldy or difficult for the shopper to use or which are extremely expensive and impractical to manufacture.

In accordance with the foregoing, the present invention provides an organizer including a shopping cart clipboard and receptacle which conveniently receives and displays a shopping list to the shopper and also includes provision for the orderly receipt of purchase coupons and premiums. Briefly, in accordance with the present invention, a shopping cart organizer is provided having a writing or desk surface connected to an organizer case at a hinge. The writing surface can be engaged in a generally horizontal position at a selected location on a shopping cart as, for example, on the shopping cart handle. A clip is secured to the upper surface of the board so the user may insert appropriate writing material such as a shopping list on the writing surface. The organizer case is suspended from the upper end of the writing surface and is provided with dividers carrying appropriate index tabs. The user can insert premiums by items or food groups within the various compartments. In a further embodiment of the present invention, the case section may include a handbag compartment with a separate closure flap. The handbag compartment is adapted to receive additional items the shopper may need such as vehicle keys, coin purse and checkbook. The latter embodiment, the shopper has a unitary organizer which conveniently contains or displays all items the user will need on a shopping trip and which may be used and has the appearance of a handbag and which can be secured to the shopping cart in the manner described above.

The above and other objects and advantages of the present invention will be more fully understood and appreciated from the following description, claims and drawings in which:

FIG. 1 is a perspective view illustrating a preferred form of the organizer of the present invention secured to the handle and frame of a conventional shopping cart;

FIG. 2 is a side view of a writing instrument attachable to the organizer of the present invention;

FIG. 3 is a side view of an alternate embodiment of the organizer of the present invention;

FIG. 4 is a side elevational view of a portion of a shopping cart showing the organizer of FIG. 3 secured in place on the cart;

FIG. 5 is a perspective view showing the organizer of FIG. 3 in a closed or folded position;

FIG. 6 illustrates the organizer of the present invention as part of entire handbag system and received within the pocket of the handbag;

FIG. 7 is a top view of the holder or clipboard section of the present invention;

FIG. 8 is a sectional view taken along lines 8—8 of FIG. 7;

FIG. 9 is an exploded perspective view illustrating another embodiment of the organizer of the present invention;

FIG. 10 is a detailed view of a portion of the hinge of the embodiment shown in FIG. 9 as circled in that figure;

FIG. 11 is a perspective view of an alternate embodiment of the present invention;

FIG. 12 is a sectional view taken along line 12—12 of FIG. 11; and

FIG. 13 is a rear perspective view of the embodiment as shown in FIG. 11.

Turning now to the drawings, the organizer of the present invention is adapted to be used with conventional shopping carts of the type illustrated in FIGS. 1 and 4. A conventional shopping cart is designated by the numeral 10 and is typically of wire rod construction having opposite side walls 12 and end walls 14 which form a generally cubical basket for reception of items. The basket 16 is supported on a frame including rear members 16 which support transversely extending handle 18. Shopping carts generally include an adjustable inner partition wall having a transverse rod 21 forwardly spaced from handle 18. The inner partition is moveable between a position in which the partition is generally in juxtaposition with the rear end wall 16 and moveable forward to an angularly displaced forward position as shown in FIG. 1 to form a subcompartment for receipt of items or, in some cases, an infant seat. The precise construction of the shopping cart 10 may vary, the foregoing general description is for purposes of illustration only it being understood that the organizer of the present invention will be generally adaptable to shopping carts of various configurations.

The shopping organizer of the present invention is generally designated by the numeral 20 and a preferred embodiment is illustrated in FIGS. 1 and 2. The organizer includes two main sections or portions, a desk section 22 and a receptacle section 24 which are interconnected at transversely extending hinge 26. The desk section 22 includes a generally rectangular plate 28 having opposite coplanar surfaces 30 and 32. The size of the board 28 may vary but is preferably selected to accomodate conventional notepaper and memo pads and be compatible with conventional ladies handbags.

A conventional spring clip 34 is secured near the upper end of the surface 30 and serves to retain writing material such as a memo pad or list 34 in place as best seen in FIG. 1. A writing instrument 36 such as a pencil or pen is positioned along one longitudinal edge of the plate 32 by any suitable attachment means such as a string or cord, or as is shown, by mating loop and pile fastener members 40 such as the type sold under the trademark "Velcro". A pair of brackets 42 project from the lower surface 32 of plate 28 near the opposite longitudinal edges 41. The brackets 42 are formed having an arcuate surface 44 generally compatible with the curvature of transverse handle or push bar 18. It will be seen that the holder can be placed in a generally horizontal position with the brackets 42 supported on handle 18 to place the desk section 22 in a convenient position for the user.

Receptacle portion 24 includes front panel 50 and rear panel 52 which are joined along their lower edges and can be folded outwardly to form a compartment 54 as best seen in FIG. 1. Expandable side panels 56 extend between front and rear panel 52. The upper edge of rear panel 52 is secured to transverse hinge 26. Hinge 26 is preferably continuous hinge such as a "piano" type hinge which are well-known. A closure flap 56 also extends from the upper edge of rear panel 52 and in the closed position overlaps front panel 50 to protect the contents of compartment 54. An appropriate closure such as cooperating loop and pile fastener members may be applied to the inside of flap 56 and the outer surface of panel 50. Flap 56, for convenience of illustration, has been shown broken away to better illustrate the contents of compartment 54. Compartment 54 is preferably subdivided into subcompartments or sections by divider or index panels 60 each of which may carry an appropriate indicia on the projecting tab 62. The user can categorize coupons and premiums within the various subcompartments by food or other grouping.

Hook members 58 project adjacent opposite sides of panel 52 having a lip 62 adapted to engage one of the transverse rods 21 of the cart 10. With hooks 58 engaged, receptacle 24 is supported in a generally horizontal position.

The present invention will be more completely understood from the following description of use. Prior to embarking on a shopping trip, the shopper will make a list of items intended to be purchased on a memo pad 34. The memo pad 34 is placed under the spring clip 32 on the desk or writing surface 30. Coupons or premiums intended to be redeemed while shopping are categorized and placed in the appropriate subcompartment within compartment 54. Entire organizer unit 20 is then closed by engaging flap 56 at front panel 50. The unit is folded into a compact arrangement and can be conveniently inserted in a pocket 61 of a conventional handbag such as handbag 60 illustrated in FIG. 6. When the shopper arrives at the store or market, the organizer 20 can be removed from the handbag 60 and folded and placed in engagement with a shopping cart 10 supported at brackets 42 and hooks 58. The memo pad 34 is displayed in a convenient generally horizontal position so the user can mark or check-off items with writing instrument 36 as they are placed in the basket. This leaves both of the shoppers hands free to maneuver the cart and place items in the basket. It is not necessary to continually handle the shopping list and check-off items that are purchased which requires physical manipulation and which are both inconvenient and frustrating. Receptacle 24 is also supported in a convenient generally vertical position. When a shopper is checking out at the cashier stand, flap 56 may be opened to expose the contents of compartment 54. As items are removed from the shelf, appropriate coupons can be removed and placed in order under the clip and then applied to the purchase of the particular items at check-out. Shopping receipts and any other items such as redeemable stamps can be placed in appropriate subcompartments in compartment 54. The entire organizer 20 can be folded in a compact position and be reinserted in a pocket 61 of the shopper's handbag for transportation.

FIG. 3 shows another embodiment of the present invention generally designated by the numeral 70 which is provided with a board or desk section 72 connected at hinge 74 to a receptacle section 73. These components are generally as has been described with reference to FIG. 1 and further detailed description is not deemed necessary. The writing instrument is retained in place on the desk surface by a tubular clip 81 which has spaced-apart lips which have sufficient flexibility to permit them to be spread apart to facilitate insertion of a pencil or other writing instrument.

The embodiment of the invention in FIG. 3 is engageable on a transverse rod of the shopping cart at hook 75. The desk portion 72 is retained in place by a flexible fastener shown as an elongated strap 76 secured at one end 78 to the under side of desk 72. The opposite end 82 is provided with a portion of loop and pile fastener material 85 which is engageable with mating loop and pile fastener 83 secured to the under side of the desk surface 72. As is best seen in FIG. 3, the strap 76 is engaged about the handle or push bar 18 and pulled taut and end 82 engaged at fastener sections 83 and 85. As best illustrated in FIG. 5, the entire organizer 70 can be folded into a compact unit with desk section 72 engaging the rear panel of receptacle section 73.

FIGS. 9 and 10 illustrate still another embodiment of the present invention which is generally designated by the numeral 90. In this embodiment the organizer is a composite structure formed in one piece from a sheet of conventional material such as a thermo plastic material. Conventional plastic materials include cellulose butyrate acetate, styrene polymers, acrylics and combinations of these various materials. As so formed, the organizer includes a desk section 92 and a backing plate 94 for the receptacle 96. The sections 92 and 94 intersect at a hinge section as best seen in FIG. 10. The hinge 97 is of recuded thickness at section 98 and is of sufficient flexibility to permit relative movement between sections 92 and 94. A clip 99 is formed from a section of material in plate 94 and is reversely bent and convexly curved terminating in upwardly turned lip 100 which engages the upper surface of panel 92. The clip 98 is to secure a memo pad or other writing material in place on the surface of desk 92. Similarly, a clip 102 is formed at one longitudinal edge of desk section 92 to retain a writing instrument on this surface. Compartment 96 attached to the outer surface of section 94 is for receipt of coupons and premiums and other similar materials. The organizer 90 is positioned in place on the shopping cart by brackets 104 of the opposite longitudinal sides of panel 94 and formed integrally therewith and disposed at general right angles with respect to panel 94. Similarly, retention strap 106 is secured to the underside of panel 92 having a section of loop and pile fastener material 108 which is engageable at the underside of panel 92.

FIGS. 11 through 13 show still another embodiment of the present invention which incorporates the advantages of the present invention in connection with handbag for receipt and retention of other accessories often carried by the shopper. Embodiment shown in FIGS. 11 through 13 generally designated by the numeral 110 and includes a handbag section 112 having front panel 114 and a rear panel 116. A closure flap 118 is hingedly secured to the upper transverse edge of rear panel 116 and can be engaged at the exterior of front panel 114 to enclose handbag compartment 120.

Compartment 120 is for receipt of articles such as checkbooks, cosmetics and other sundry articles carried by shoppers. Snap fastener member 122 receives keyring 124. Similarly, pouch 126 is secured to the interior side of panel 114 for receipt of coins, identification cards, credit cards and the like. Rigid backing panel 128 is shown affixed to the outer side of rear panel 116. A hinge 130 at the upper edge of panel 128 supports desk panel 132 for pivotal movement from a position juxtaposition along side rear plate 128 to a writing position generally at right angles with respect to plate 128. Desk panel 132 is provided with clip 134 to secure a memo pad or other writing material to the outer surface of this panel. Bracket 136 projects rearwardly from panel 128 to hang or suspend the handbag compartment and receptacle from a cross rod of the shopping cart.

A receptacle 140 is carried on front panel 114 and includes rear panel 142 and front panel 144 joined at side panels 146 which are shown as pleated to allow the receptacle 140 to swing open. A flap 150 is hingedly secured to the upper edge of front panel 144 at 152. Flap 150 carries a plurality of snap fastener sections 155 engageable with mating snap fastener section 158 on the upper surface of desk panel 132. In a use-position, desk panel 132 may be swung to the position shown in FIGS. 11 and 12 and fastener 158 engaged in one of the appropriate fastener sections 155. When the organizer is not in use and in position on a shopping cart, one of the other fastener sections 155 can be engaged with fastener portion 158 and the writing panel 132 may be positioned along side panel 128 as best seen in FIGS. 13. In this position, the organizer has the general appearance of a handbag and can be used as a conventional handbag with the added features described above adapted for shopping being available to the user. Compartment 146 is again especially designed for reception of coupons, premiums and other materials to be used when shopping.

The organizer of the present invention can be made from a wide variety of materials. As mentioned above, the writing panel and backing plates are preferably constructed from a rigid material such as thermo plastic material. The receptacle portion can be made from cloth, leather or synthetic vinyl or polyurethane. Appropriate decorative effects such as embroidery, monogramming may be placed thereon. It is also within the scope of the present invention to include additional features and accessories to the organizer of the present invention. For example, a manual or electronic calculator can be attached as part of the desk section to permit the shopper to compute unit prices, totalize purchase and make other similar computations.

While some slight variation in grocery cart dimensions often occur, the organizer of the present invention will readily fit over most conventional carts. Obviously, tolerances and variations in dimensions will vary. In view of the foregoing, it will be seen that the forementioned object and advantages of the present invention are achieved. It will also be obvious to those skilled in this art to make various modifications, changes and alterations to the extent that these modifications, changes and alterations do not depart from the spirit and scope of the appended claims they are intended to be encompassed therein.

I claim:

1. A shopping cart organizer securable to a conventional shopping cart of the type having transverse handle and a forwardly spaced apart frame member, said organizer comprising:
   (a) a substantially rigid desk panel having a first upper surface and a second opposite generally coplanar bottom surface, said upper surface including means thereon for securement of writing materials;
   (b) a receptacle having a front and rear, said receptacle being hingedly secured to said first panel means and defining a compartment therein for reception of materials;
   (c) hanger means hingedly secured to said desk panel, said hanger means including hook means adapted to engage said frame member;
   (d) fastener means on the bottom surface of the desk panel adapted to secure said panel to said cart handle; and
   (e) having a first use position with said desk panel disposed in a generally horizontal position partially supported by said cart handle, for use as a desk and providing access to said writing materials, with said fastener means engaged about said handle and said hanger means engaging said frame member at a location adjacent the rear of said receptacle with said receptacle suspended in a generally vertical position, with the top of said receptacle substantially at the elevation of said deck panel, for providing easy access to the compartment therein and having a second folded position with the desk panel and receptacle juxtapositioned whereby the organizer may be inserted in a handbag or carried separately as a purse.

2. The organizer of claim 1 wherein said fastener means comprises strap means located on said second side of said desk means having associated loop and pile fasteners therewith for securement to the underside of said panel.

3. The organizer of claim 1 wherein said fastener means comprises a projecting flange means adapted to engage said shopping cart handle and frame members.

4. The organizer of claim 1 wherein said receptacle means includes panel means subdividing said compartment into subcompartments for categorization of received materials.

5. The organizer of claim 1 further including means for securing a writing instrument to said first panel means.

6. The organizer of claim 1 wherein said receptacle means includes a second substantially rigid panel and wherein said first and said second panel means are integrally formed.

7. The organizer of claim 1 further including carrying strap means extending from opposite sides of said receptacle whereby the organizer can be carried in a manner similar to a handbag in a stored position.

* * * * *